United States Patent
Colombo et al.

(10) Patent No.: US 11,111,966 B2
(45) Date of Patent: Sep. 7, 2021

(54) SYNCHRONIZER FOR MECHANICAL TRANSMISSIONS, PARTICULARLY FOR VEHICLE TRANSMISSIONS

(71) Applicant: DANA GRAZIANO S.R.L., Rivoli (IT)

(72) Inventors: Silvano Colombo, Traves (IT); Andrea Serra, Pino Torinese (IT)

(73) Assignee: DANA GRAZIANO S.R.L., Rivoli (IT)

( * ) Notice: Subject to any disclaimer, the term of this patent is extended or adjusted under 35 U.S.C. 154(b) by 117 days.

(21) Appl. No.: 16/493,081

(22) PCT Filed: Mar. 13, 2018

(86) PCT No.: PCT/IB2018/051637
§ 371 (c)(1),
(2) Date: Sep. 11, 2019

(87) PCT Pub. No.: WO2018/167649
PCT Pub. Date: Sep. 20, 2018

(65) Prior Publication Data
US 2021/0131505 A1  May 6, 2021

(30) Foreign Application Priority Data
Mar. 13, 2017 (IT) .................. 102017000027425

(51) Int. Cl.
*F16D 23/06* (2006.01)
*F16D 23/02* (2006.01)

(52) U.S. Cl.
CPC .......... *F16D 23/025* (2013.01); *F16D 23/06* (2013.01); *F16D 2023/0631* (2013.01); *F16D 2023/0637* (2013.01); *F16D 2200/0034* (2013.01)

(58) Field of Classification Search
CPC ...... F16D 23/02–2023/0637; F16D 2200/0034
See application file for complete search history.

(56) References Cited

U.S. PATENT DOCUMENTS 4,584,892 A    4/1986  Hiraiwa
4,776,228 A *  10/1988  Razzacki ................ F16D 23/06
                                                    192/53.34

(Continued)

FOREIGN PATENT DOCUMENTS

DE      20216782      3/2004
DE    202006008636    8/2006

(Continued)

OTHER PUBLICATIONS

European Patent Office, International Search Report with Written Opinion issued in application No. PCT/IB2018/051637, dated Mar. 13, 2017, 10 pages, Rijswijk Netherlands.

*Primary Examiner* — David R Morris
(74) *Attorney, Agent, or Firm* — McCoy Russell LLP

(57) ABSTRACT

A synchronizer for mechanical transmissions having a phasing system configured so as to include a plurality of first cavities on an internal cylindrical surface of a rim of a hub, the hub torsionally connected with a transmission shaft, forming the external teeth of the hub and, for each of the first cavities, either a tooth which radially protrudes from an external cylindrical surface of a synchronizing ring of the synchronizer and is arranged to engage in the first cavity, or a connecting pin arranged to engage on one side the first cavity and on the other a respective second cavity on the external cylindrical surface, wherein the first cavities have an arc- or round-shaped cross-section.

11 Claims, 7 Drawing Sheets

(56) References Cited

U.S. PATENT DOCUMENTS

| | | | | |
|---|---|---|---|---|
| 5,036,719 A | * | 8/1991 | Razzacki | F16D 23/06 |
| | | | | 74/339 |
| 8,286,776 B2 | * | 10/2012 | Doernhoefer | F16D 23/025 |
| | | | | 192/107 R |
| 8,387,754 B2 | * | 3/2013 | Konig | F16D 23/04 |
| | | | | 184/6.12 |
| 10,830,288 B2 | * | 11/2020 | Rulfi Fertilio | F16D 23/06 |
| 2010/0200335 A1 | * | 8/2010 | Konig | F16H 57/043 |
| | | | | 184/6.12 |
| 2011/0056793 A1 | * | 3/2011 | Dornhofer | F16D 23/025 |
| | | | | 192/108 |
| 2013/0341148 A1 | | 12/2013 | Christoffer | |
| 2015/0354638 A1 | | 12/2015 | Negele | |
| 2020/0011383 A1 | * | 1/2020 | Rulfi Fertilio | F16D 23/06 |

FOREIGN PATENT DOCUMENTS

| | | |
|---|---|---|
| DE | 102015202738 | 8/2016 |
| EP | 2166244 | 3/2010 |
| WO | 2004005739 | 1/2004 |

\* cited by examiner

SYNCHRONIZER FOR MECHANICAL TRANSMISSIONS, PARTICULARLY FOR VEHICLE TRANSMISSIONS

BACKGROUND OF THE INVENTION

The present invention relates in general to a synchronizer for mechanical transmissions, such as for example vehicle transmissions, and more in particular to a synchronizer provided with a pre-synchronization system and with a phasing system.

A synchronizer of the type specified above is usually intended to torsionally connect a shaft of a vehicle gearbox selectively with one or the other of a pair of gear wheels idly mounted on said shaft or, alternatively, in case of a so-called single synchronizer, to torsionally connect or disconnect a shaft of a vehicle gearbox with a gear wheel idly mounted on said shaft.

Synchronizers for mechanical transmissions are known, which basically comprise:
 a hub torsionally connected with a shaft of the transmission,
 an actuating sleeve slidable along an axial direction (that is, parallel to the longitudinal axis of the shaft) under control of a control member (for example a fork-like control member),
 a pair of synchronizing rings, each having external teeth arranged to mesh with corresponding internal engagement teeth of the actuating sleeve and, on the radially internal side, a friction surface (in particular a conical surface) arranged to be brought into engagement with a corresponding friction surface associated to the respective gear wheel to allow the generation of a friction torque between the synchronizing ring and the gear wheel,
 a phasing system arranged to ensure a proper angular positioning of each synchronizing ring with respect to the hub about the longitudinal axis, and
 a pre-synchronization system radially placed between the hub and the actuating sleeve.

In known synchronizers, the phasing system typically comprises, for each synchronizing ring, a plurality of teeth radially protruding from an external cylindrical surface of the synchronizing ring and each engaging in a respective cavity provided in the hub. The teeth, and therefore the respective cavities too, have a cross-section with an approximately rectangular shape, with a pair of straight flanks, that extend in a radial direction and are thus approximately parallel one to the other. Such a configuration of the phasing system requires a dedicated machining both of the hub, for making the cavities, and of the synchronizing rings, for making the teeth, which makes the manufacturing process of the synchronizer more complicated. Furthermore, given the conformation of the cavities of the phasing system, ensuring the required mechanical strength of the hub is problematic.

In known synchronizers, the pre-synchronization system comprises a plurality of blocking elements, in particular three blocking elements angularly spaced apart by 120 degrees from each other, each accommodated in a respective axial through cavity of the hub to cooperate with the synchronizing rings. Each blocking element comprises a hollow body, a coil spring accommodated in the hollow body and extending with its axis in a radial direction, and a ball-shaped engaging member that is pushed radially outwards by the spring so that the engaging member partially protrudes from the hollow body through a radial through hole provided on a radially external wall of the hollow body and engages in a respective seat provided on the internal cylindrical surface of the actuating sleeve. The hollow body, the engaging member and the spring preferably form an integrated assembly that is mountable as a single part on the hub of the synchronizer.

When the actuating sleeve is moved axially in a given direction to torsionally connect the shaft with a given idle gear wheel associated to it, in a first phase of the engagement operation the balls of the blocking elements, that are kept within the respective cavities of the actuating sleeve by the respective springs, are moved axially, together with the actuating sleeve, thereby carrying with them the respective bodies. The bodies of the blocking elements push in turn the synchronizing ring of the gear wheel to be connected so as to bring the friction surface of the synchronizing ring in contact with the corresponding friction surface of the gear wheel. As a result of the engagement of the friction surfaces of the synchronizing ring and of the gear wheel, the synchronizing ring rotates with respect to the actuating sleeve by such an angle that the teeth of the synchronizing ring prevents a further axial movement of the actuating sleeve towards the engagement teeth of the gear wheel.

Once the angular speeds of the synchronizing ring (that is, of the hub and of the actuating sleeve) and of the gear wheel have been synchronized, the actuating sleeve can be further moved axially towards the gear wheel to have its engagement teeth mesh with the engagement teeth of the gear wheel. This further axial movement of the actuating sleeve causes the balls to move out of the cavities, as the balls are pushed radially inwards by the profile of the cavities of the actuating sleeve.

Such a configuration of the pre-synchronization system has the drawback of the significant size of the blocking elements, particularly in radial direction, which requires to provide the hub with particularly deep cavities. This, on the one side, reduces the mechanical strength of the hub and, on the other, reduces the maximum diameter of the shaft on which the hub of the synchronizer can be mounted, the diameter of the actuating sleeve remaining unchanged.

SUMMARY OF THE INVENTION

It is an object of the present invention to provide a synchronizer for mechanical transmissions having an improved phasing system with respect to the prior art discussed above, in particular a phasing system that does not make the manufacturing process of the synchronizer excessively complicate and that does not adversely affect the compact size and the mechanical strength of its components, in particular of the hub.

This and other objects are fully achieved according to the invention by virtue of a synchronizer for mechanical transmissions having the features set forth in the attached independent claim 1.

In short, the invention is based on the idea of configuring the phasing system of the synchronizer so as to comprise a plurality of first cavities on an internal cylindrical surface of a rim of the hub forming the external teeth of the hub and, for each of said first cavities, either a tooth which radially protrudes from an external cylindrical surface of said at least one synchronizing ring and is arranged to engage in said first cavity, or a connecting pin arranged to engage on one side said first cavity and on the other a respective second cavity on said external cylindrical surface, wherein said first cavities have an arc- or round-shaped cross-section, in particular a semi-circular cross-section.

By virtue of the particular shape of the first cavities in the hub, that allows to make such cavities by simple drilling operations, the hub is simpler, and thus also less expensive, to manufacture. Furthermore, such a shape of the first cavities allows to reduce sharp edges, and thus notch effects, with resulting increase in the mechanical strength of the hub.

In a first embodiment of the phasing system, the proper angular positioning of each synchronizing ring with respect to the hub is obtained by virtue of the engagement of radial teeth of the synchronizing ring in the first cavities of the hub. Such radial teeth will have, therefeore, a cross-section with a shape mating the one of the first cavities, in particular a semi-circular cross-section.

In a second embodiment of the phasing system, the proper angular positioning of each synchronizing ring with respect to the hub is obtained by virtue of the engagement of pins in cylindrical seats formed by the first cavities of the hub and by second cavities (also having an arc-shaped cross-section, in particular a semi-circular cross-section) provided in the synchronizing ring.

Preferably, the pre-synchronization system comprises a plurality of blocking elements configured in such a way that the engaging member thereof protrudes in a substantially tangential direction, instead of a radial one, from the body of the blocking element and moves with respect to said body in a substantially tangential direction, instead of a radial one. By virtue of such a configuration, the blocking elements have a significantly smaller radial size than the prior art. As a consequence, it is no more required to provide dedicated cavities in the hub for receiving the bodies of the blocking elements and therefore the hub has a higher mechanical strength than the prior art. Furthermore, the diameter of the actuating sleeve remaining unchanged, it is possible to make a hub with a larger internal diameter than the prior art and therefore to use the synchronizer on shafts with a larger diameter than the prior art.

According to an embodiment, the engaging member of each blocking element is a disk-shaped member and extends through a through opening provided in a lateral face of the body.

The spring of each blocking element may be made as an S-shaped wire or strip spring.

Preferably, the body of each blocking element is made of plastic material, which allows to further reduce the weight and the overall cost of the synchronizer with respect to the prior art.

BRIEF DESCRIPTION OF THE DRAWINGS

Further features and advantages of the present invention will become apparent from the following detailed description, given purely by way of non-limiting example, with reference to the appended drawings, wherein.

DETAILED DESCRIPTION OF PREFERRED EMBODIMENTS OF THE INVENTION

Figure 1:
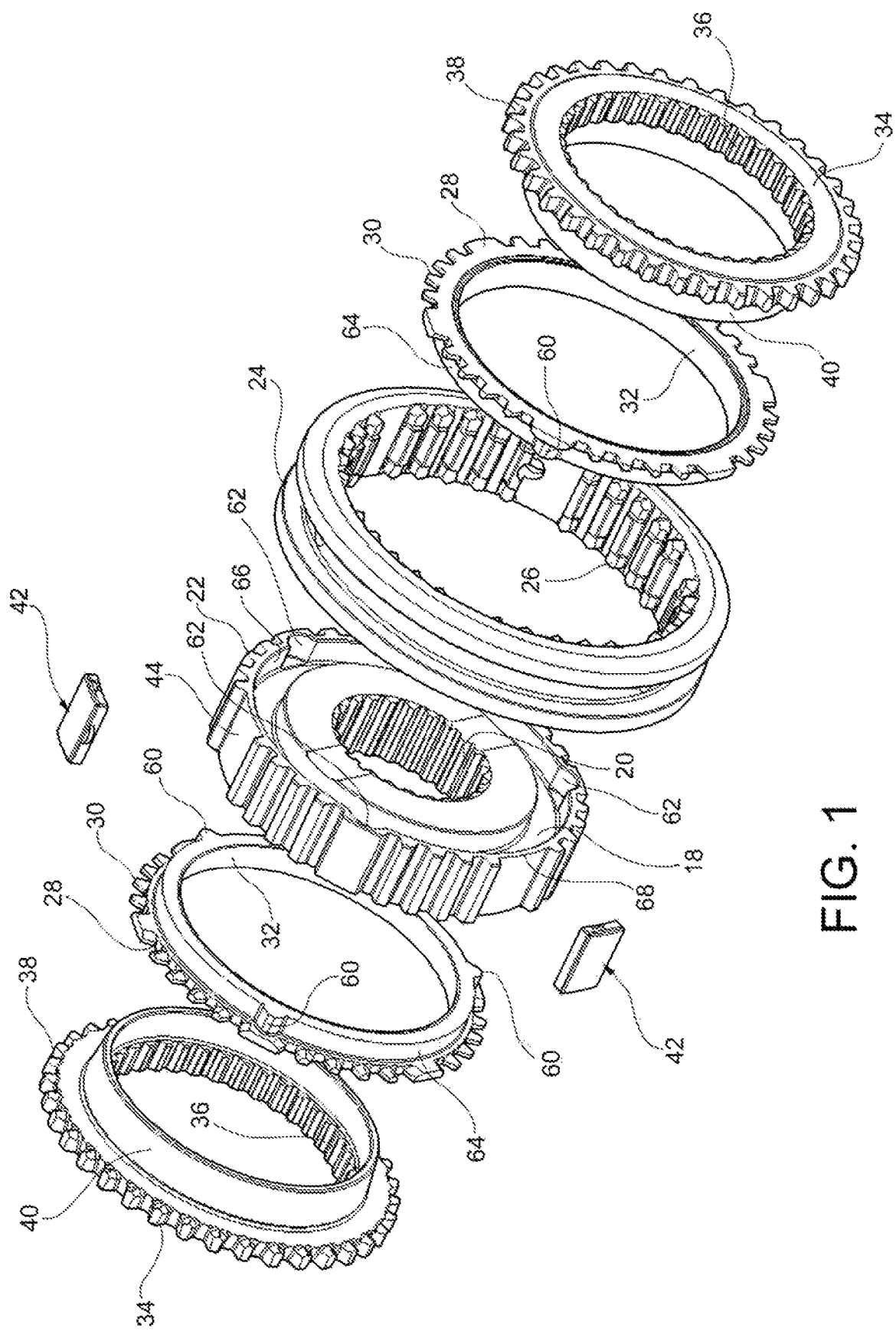
FIG. 1 is an exploded view of a synchronizer for mechanical transmissions according to an embodiment of the present invention.
Figure 2:
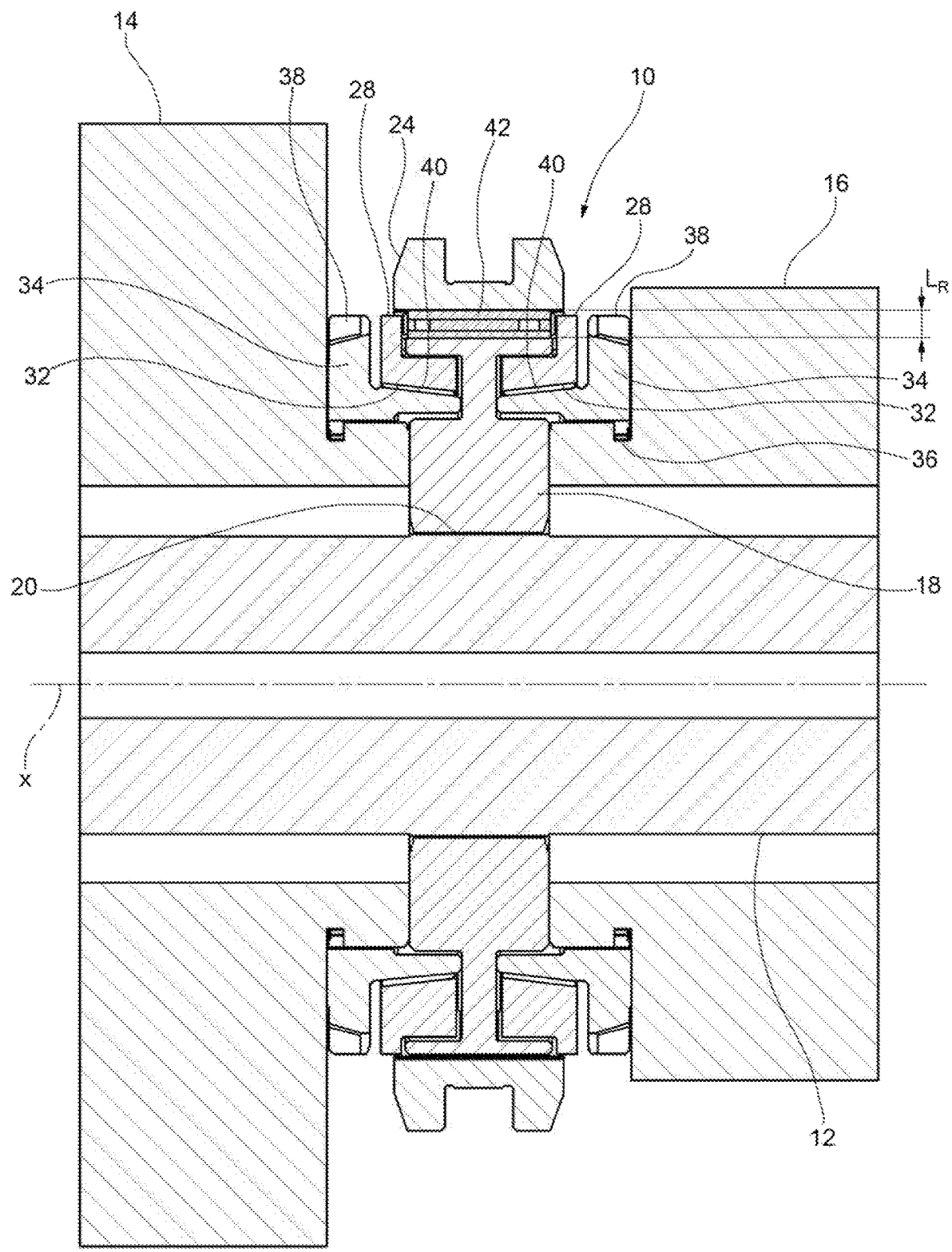
FIG. 2 is an axial section view of the synchronizer of FIG. 1 mounted on a transmission shaft between a pair of gear wheels.
Figure 3:
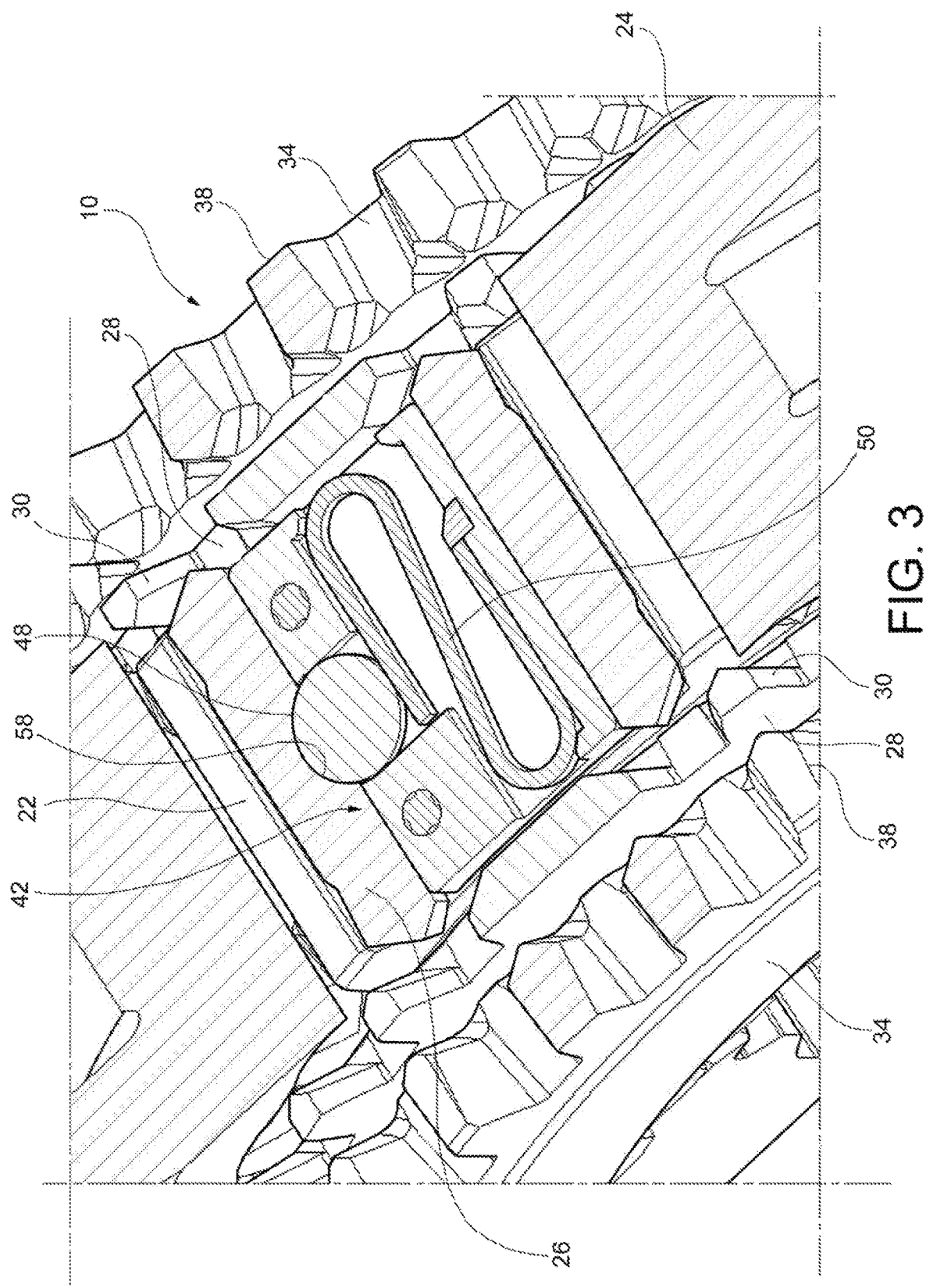
FIG. 3 synchronizer shows in detail a blocking element of the pre-synchronization system in the assembled condition of the synchronizer of FIG. 1.
Figure 4:
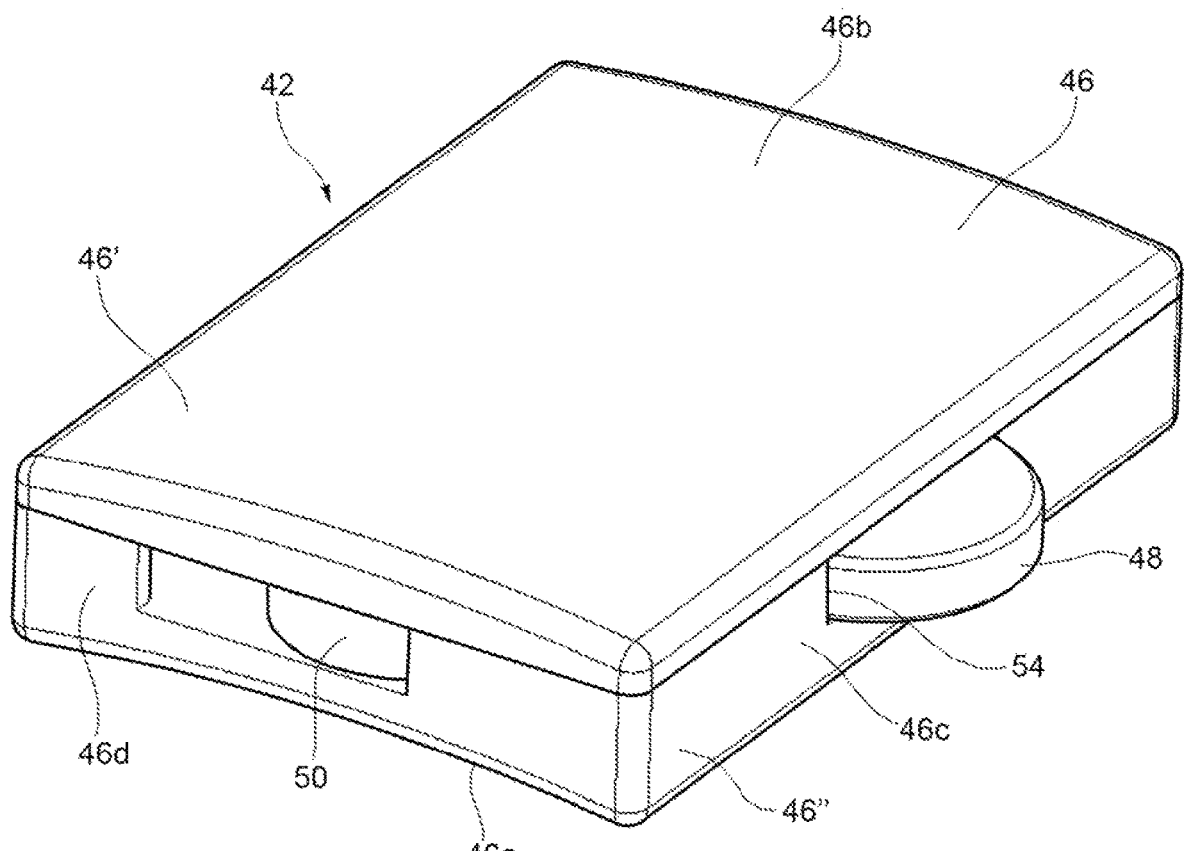
FIG. 4 is a perspective view of a blocking element of the pre-synchronization system of the synchronizer of FIG. 1.
Figure 5:
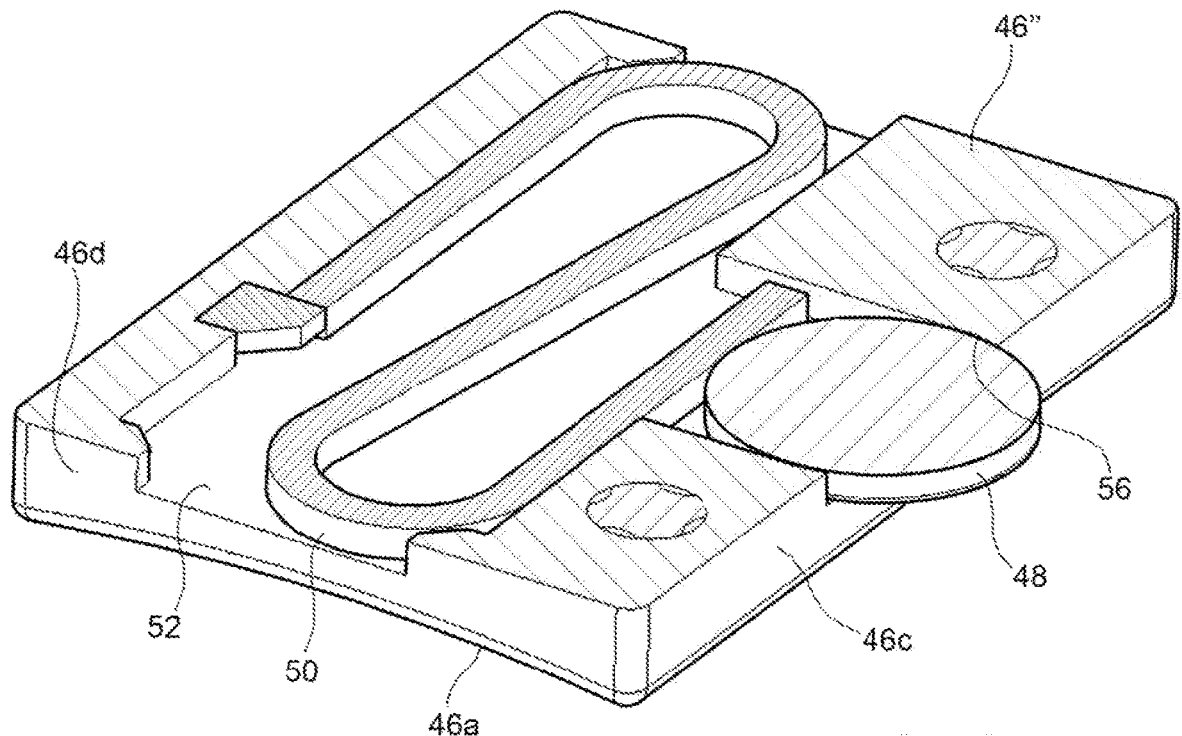
FIG. 5 shows a section of the blocking element of FIG. 4.
Figure 6:
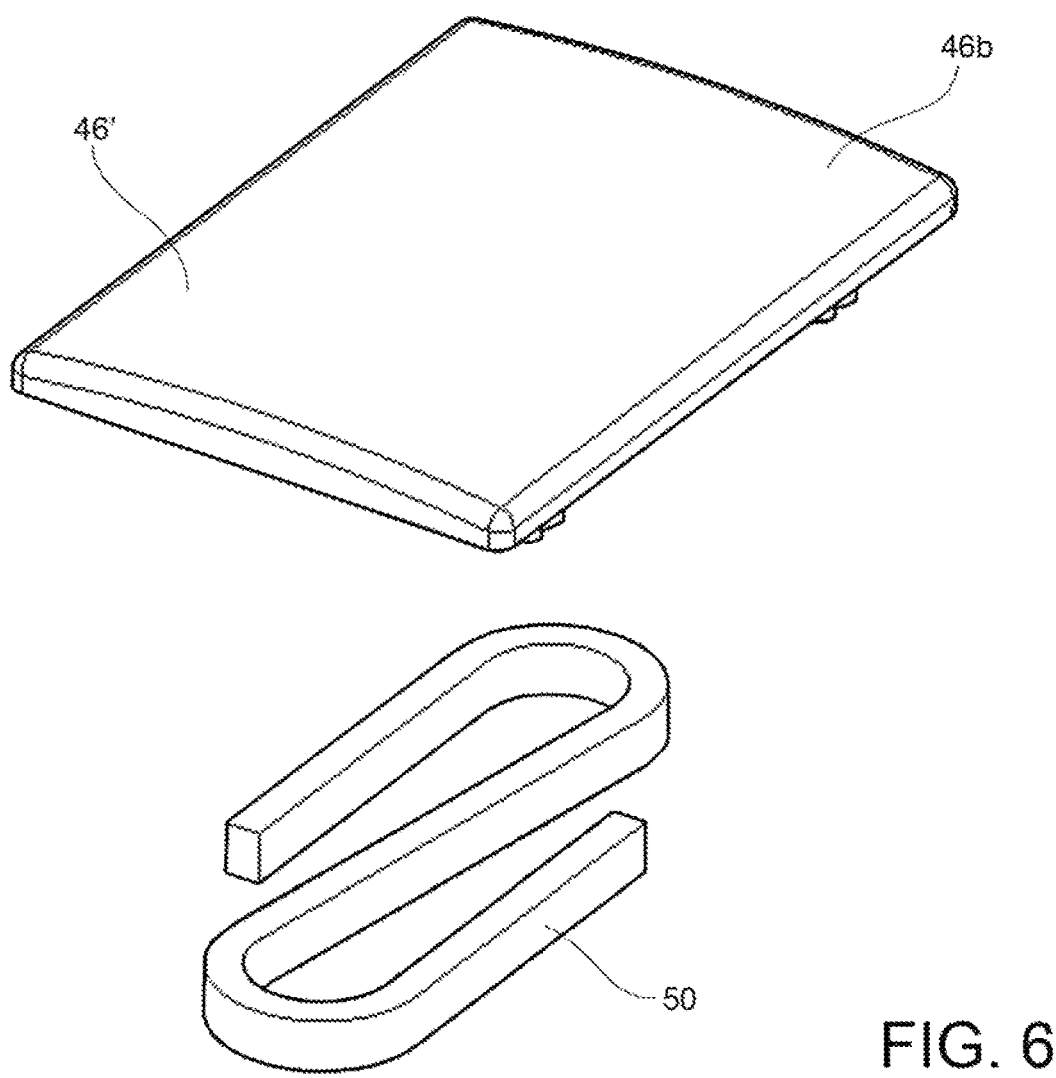
FIG. 6 is an exploded view of the blocking element of FIG. 4.
Figure 6:
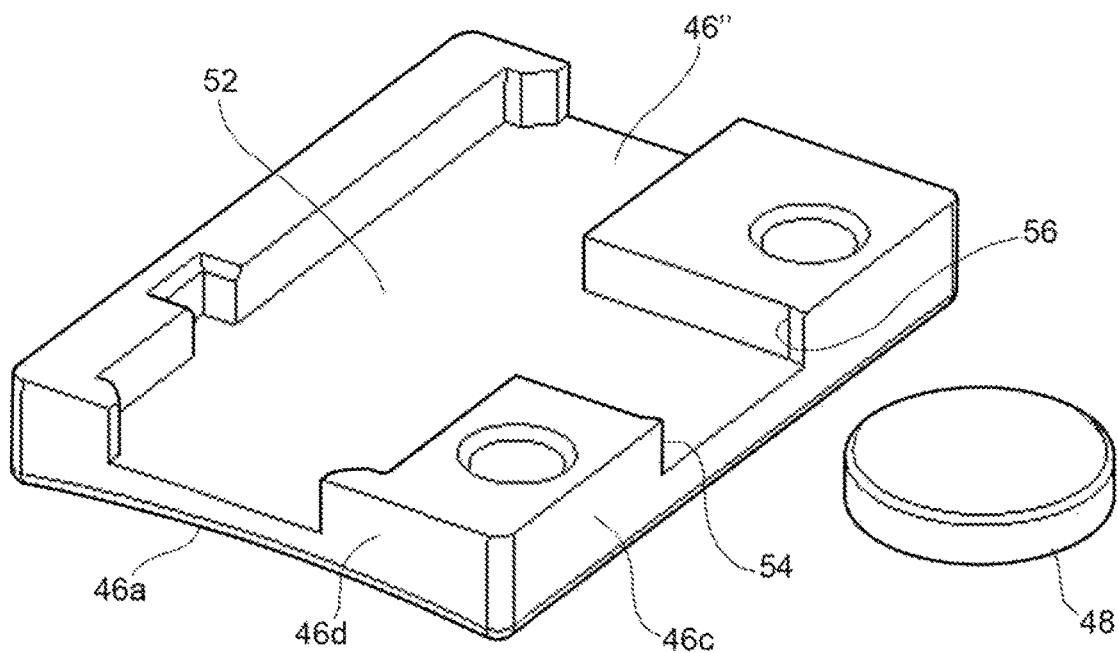

With initial reference to FIGS. 1 to 3, a synchronizer for vehicle transmissions according to an embodiment of the present invention is generally indicated with 10.

In the embodiment shown, the synchronizer 10 is a so-called double synchronizer, that is, a synchronizer intended to be mounted on a transmission shaft 12 between a pair of gear wheels 14 and 16 to selectively connect one or the other of said wheels 14 and 16 for rotation with the transmission shaft 12. The invention is not however limited to a double synchronizer, but may also be applied to a so-called single synchronizer, that is, a synchronizer associated with a single gear wheel to selectively connect said gear wheel for rotation with the shaft.

The synchronizer 10 basically comprises:
a hub 18 which is arranged to be torsionally connected to the transmission shaft 12, for example through splined coupling 20, and is provided with external teeth 22;
an actuating sleeve 24 which is axially slidable (that is, in a direction parallel to the longitudinal axis of the transmission shaft 12, indicated x in FIG. 2) under the control of a control member (not shown), for example a fork-like control member, and is provided with internal teeth 26 meshing with the external teeth 22 of the hub 18;
a pair of synchronizing rings 28, each of which is provided with external teeth 30 arranged to mesh with the internal teeth 26 of the actuating sleeve 24 and has, on its radially internal side, a friction surface 32, in particular a conical surface;
a pair of engagement ring gears 34 arranged to be torsionally connected, for example through splined coupling 36, each with one of the two gear wheels 14 and 16, each engagement ring gear 34 being provided with external teeth 38 intended to mesh with the internal teeth 26 of the actuating sleeve 24 to allow torque transmission between the transmission shaft 12 and the idle gear wheel 14 or 16 via the synchronizer 10 and having a friction surface 40, for example a conical surface, arranged to cooperate with the friction surface 32 of a respective synchronizing ring 28 to allow the generation of a friction torque between the synchronizing ring 28 and the respective engagement ring gear 34, and therefore between the synchronizing ring 28 and the respective gear wheel 14 or 16;
a pre-synchronization system comprising a plurality of switching elements 42 (for example three switching elements 42 arranged with an angular spacing of 120° one to another) radially placed between the hub 18 and the actuating sleeve 24; and
a phasing system arranged to ensure the proper angular positioning of each synchronizing ring 28 with respect to the hub 18 about the longitudinal axis x.

Each blocking element 42 is accommodated in a respective seat 44 made on the external periphery of the hub 18 by interruption of the external teeth 22. Preferably, as in the embodiment shown herein, the depth of the seat 44 is substantially the same as that of the external teeth 22 of the hub 18. In other words, the internal diameter of the seat 44 is preferably substantially equal to the root diameter of the external teeth 22 of the hub 18. Therefore, the presence of the seat 44 does not significantly reduce the radial thickness of the hub 18 (differently from the seats provided in the prior art). Clearly, this has the advantage of making the hub 18 more resistant than the prior art. Furthermore, the deformations the hub undergoes during heat treatment are reduced. Besides, the external diameter of the hub 18 remaining unchanged, that is, the internal diameter of the actuating sleeve 24 remaining unchanged, the hub 18 may have a larger diameter of the splined portion 20 and therefore be mounted on transmission shafts having a larger diameter than in the prior art.

With reference now in particular to FIGS. 2 to 6, each blocking element 42 basically comprises a body 46 mounted in the seat 44, an engaging member 48 and an elastic member 50 accommodated in an internal cavity 52 of the body 46.

According to an embodiment, the body 46 has an essentially parallelepiped general shape, with a bottom face 46a (that is, a radially internal face), a top face 46b (that is, a radially external face), a pair of first lateral faces 46c extending one parallel to the other and a pair of second lateral faces 46d extending one parallel to the other. The bottom face 46a preferably has an arc-shaped cross-section with a curvature radius corresponding to the radius of the bottom surface of the seat 44 so as to adapt to the shape of said surface. The first lateral faces 46c extend parallel to the longitudinal axis x. The second lateral faces 46d extend perpendicular to the longitudinal axis x, on opposite sides with respect to a plane perpendicular to the longitudinal axis x and passing through the centre of the hub 18.

In the assembled condition of the synchronizer 10, as shown in FIG. 3, the body 46 is in contact with one of its first lateral faces 46c against the flank of one of the internal teeth 26 of the actuating sleeve 24 and with the other lateral face 46c against the flank of one of the internal teeth 26 of the actuating sleeve 24 (as in the example shown in FIG. 3) or, alternatively, against the flank of one of the external teeth 22 of the hub 18.

The body 46 is preferably formed by two body parts 46' and 46'', separate from one another, namely a top part (that is, a radially external part) and a bottom part (that is, a radially internal part), respectively, which are rigidly connected one to the other, for example by welding, and form the external face 46b and the internal face 46a of the body 46, respectively.

The body 46 may be made of plastic material, to reduce the weight and the overall cost of the synchronizer.

Anyway, the body 46 may have a shape other than the one proposed herein.

The engaging member 48 is formed, in the embodiment proposed herein, by a disk-shaped member. The engaging member 48 is pushed by the elastic member 50 in a first operative position (shown in FIGS. 3 to 5), wherein it partially protrudes from one of the two first lateral faces 46c through a slit 54 provided in the body 46, in a substantially tangential direction. Preferably, the engaging member 48 is secured to the body 46, for example by means a small flaring 56 provided in the portion of the slit 54 facing said face 46c, so as not to protrude further out of the body 46 beyond said first operative position. As shown in FIG. 3, in the first operative position the engaging member 48 engages in a cavity 58 provided in the flank of the internal tooth 26 of the actuating sleeve 24 which one of the two first lateral faces 46c of the body 46 (see FIG. 3) is in contact with, in such a way that the body 46 is axially restrained to the actuating sleeve 24, that is, it is drivingly connected for translation with the actuating sleeve 24 in the direction of the longitudinal axis x.

The elastic member 50 is made for example as an S-shaped wire or strip spring and insists on one side against the engaging member 48 and on the other against a wall of the body 46 opposite to the one where the slit 54 is provided, so as to normally push the engaging member 48 in the first operative position defined above and be able to deform elastically, exerting on the engaging member 48 an elastic reaction force, when the engaging member 48 is pushed towards the inside of the body 46, so as to allow the displacement of the engaging member 48 in a second operative position wherein the engaging member 48 is completely accommodated within the body 46, that is, it does not protrude outwardly with respect to the face 46c of the body 46 where the slit 54 is provided. The elastic member 50 may, nevertheless, have a shape other than the one shown in the appended drawings.

By virtue of such a configuration of the blocking elements 42, the engaging member 48 of each blocking element 42 protrudes from the body 46 in a substantially tangential direction, instead of a radial one, and moves with respect to the body 46 in a substantially tangential direction, instead of a radial one. Accordingly, the body 46 of each blocking element 42 has a significantly smaller radial size (indicated LR in FIG. 2) than in the prior art. The ratio of the radial size LR of the body 46 to the operative radius of the synchronizer 10 (that is, the pitch radius of the external teeth 22 of the hub 18) is smaller than 1/6, preferably smaller than 1/10. Advantageously, the radial size LR of the body 46 is not greater than the depth of the teeth of the external teeth 22 of the hub 18.

Figure 7:
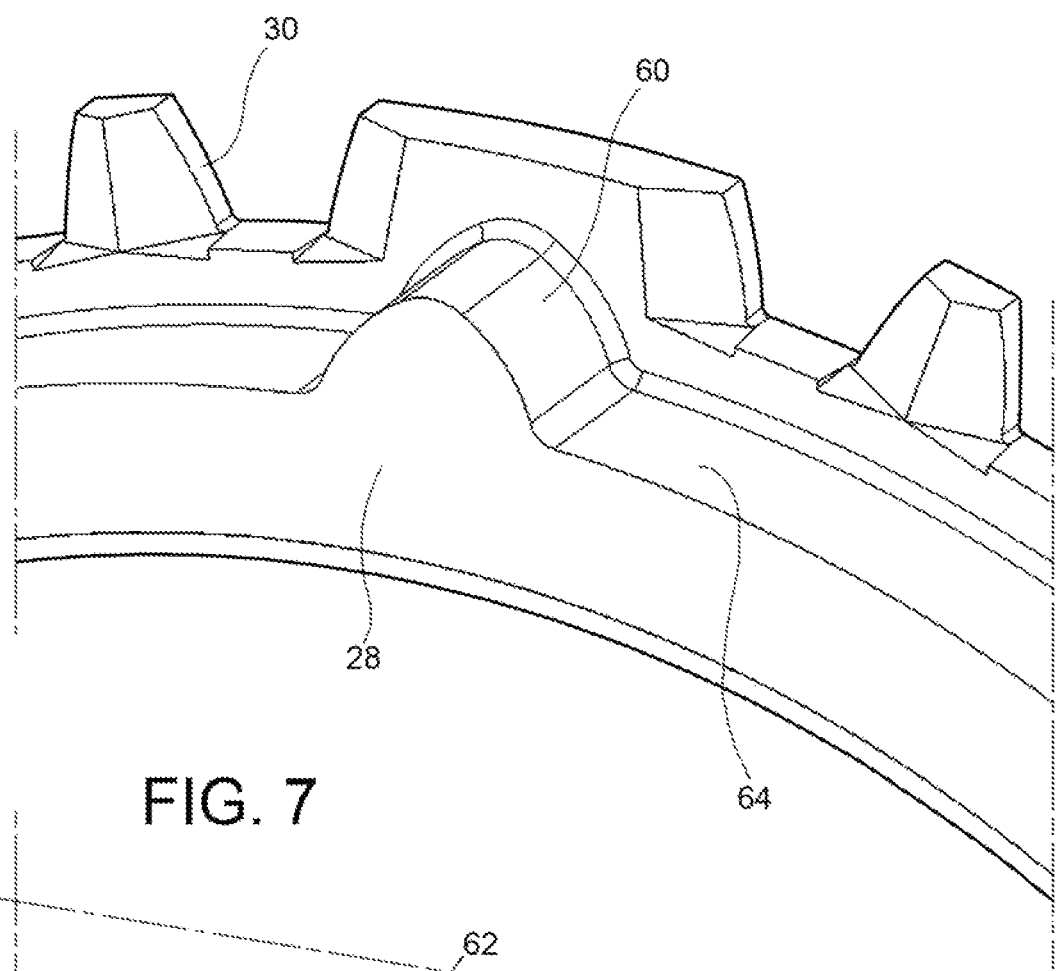
FIGS. 7 and 8 show a detail of one of the two synchronizing rings and a detail of the hub of the synchronizer of FIG. 1, respectively.
Figure 8:
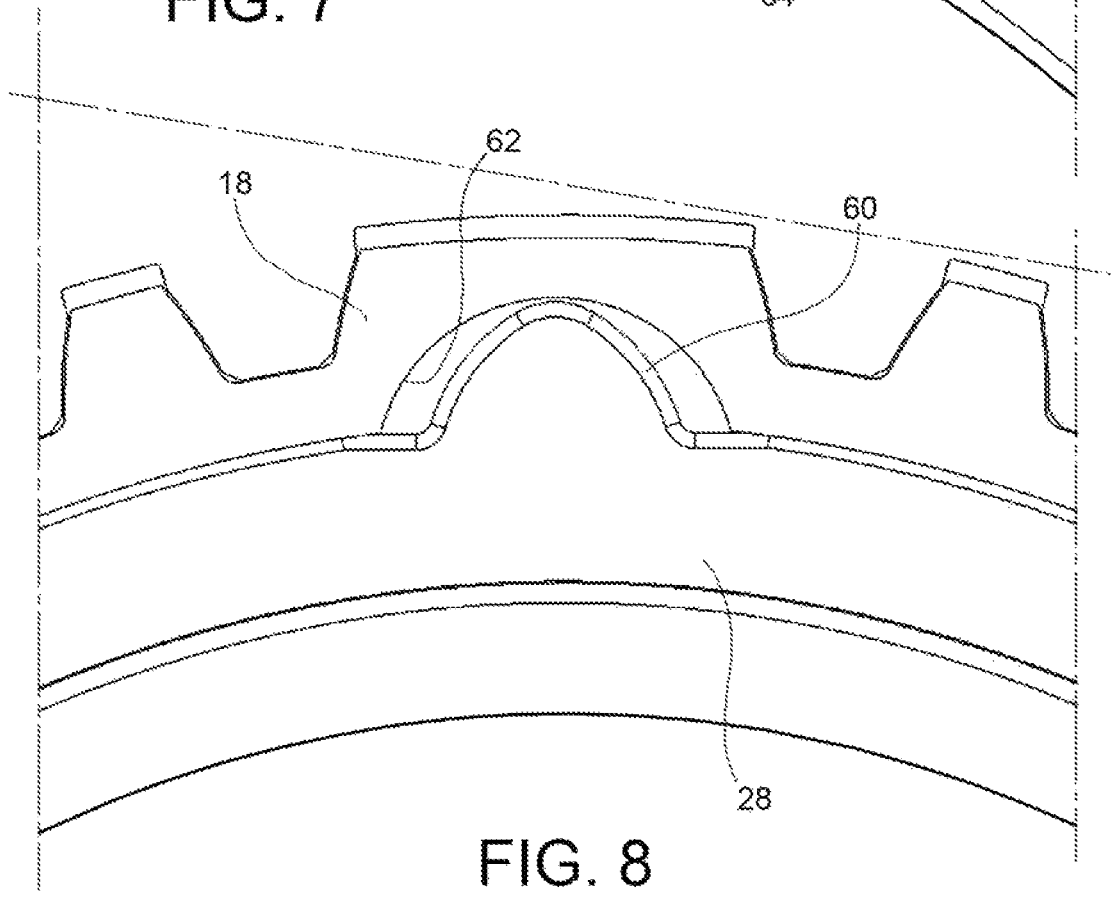

With reference to FIGS. 1, 7 and 8, according to a first embodiment the phasing system comprises, for each of the two synchronizing rings 28, a plurality of teeth 60 (for example three teeth 60 spaced apart by 120 degrees from one another) each arranged to engage in a corresponding cavity 62 of the hub 18.

The teeth 60 protrude radially outwards from an external cylindrical surface 64 of each synchronizing ring 28 on the side facing the hub 18.

The cavities 62 of the hub 18 preferably have an arc- or round-shaped cross-section, in particular a semi-circular cross-section, which allows to reduce the notch effects and thus make the hub 18 more resistant. The cavities 62 are obtained on an internal cylindrical surface 66 of a ring gear 68 of the hub 18 forming the external teeth 22. Such an arrangement and shape of the cavities 62 allows to make said cavities in a very simple way (for example, by simple drilling operations) and does not adversely affect the mechanical strength of the hub 18.

Therefore, also the teeth 60 of the synchronizing rings 28 have an arc- or round-shaped cross-section, mating the shape of the cross-section of the cavities 62.

Figure 9:
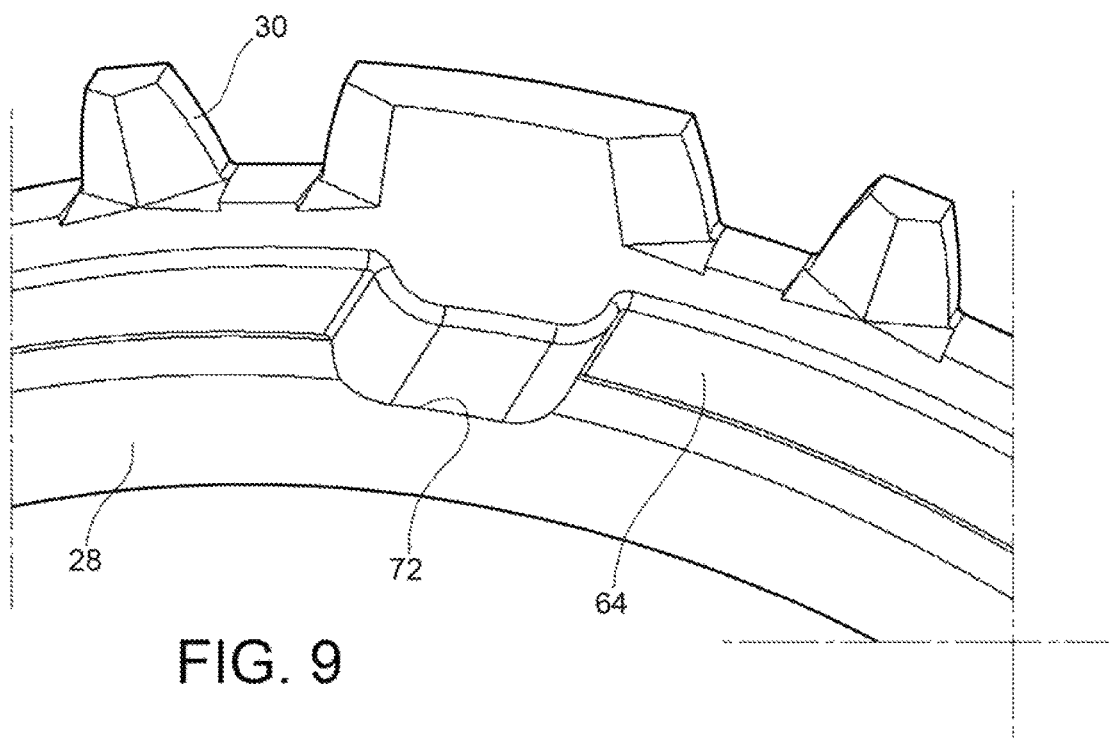
FIGS. 9 and 10 show a detail of one of the two synchronizing rings and a detail of the hub of a synchronizer for mechanical transmissions according to an alternative embodiment of the present invention, respectively.
Figure 10:
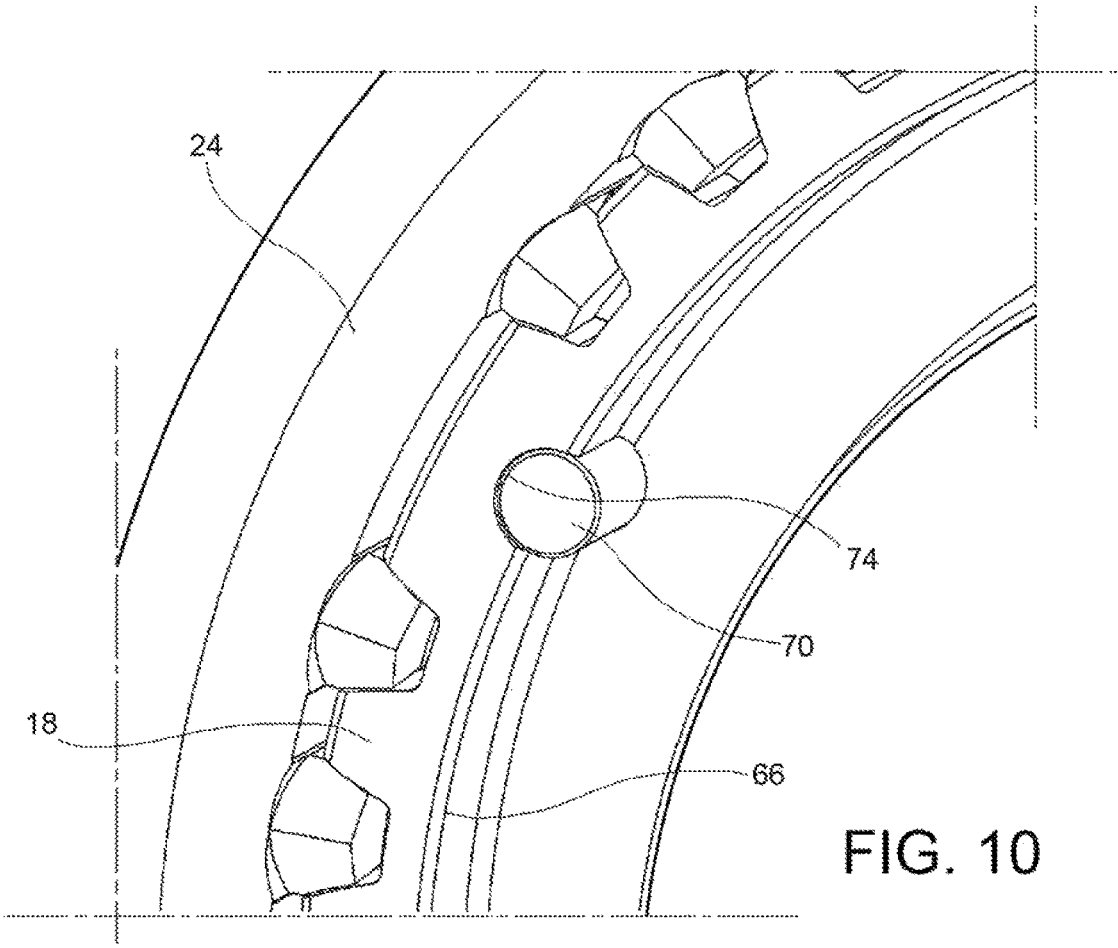

FIGS. 9 and 10 show an alternative embodiment of the phasing system, wherein the rotational coupling between each synchronizing ring 28 and the hub 18 is obtained by means of a plurality of connecting pins 70, preferably having have a circular cross-section, each of which is inserted partly in a cavity 72 provided in the above-mentioned external cylindrical surface 64 of the synchronizing ring 28 and partly in an opposed cavity 74 provided in the above-mentioned internal cylindrical surface 66 of the hub 18.

Both the cavities 72 of the synchronizing rings 28 and the cavities 74 of the hub 18 have an arc- round-shaped cross-section, in particular a circular cross-section. Thus, each cavity 72 and each corresponding cavity 74 define jointly a seat, in particular a seat with a circular cross-section, into which the respective connecting pin 70 is inserted.

With such a phasing system, synchronizing rings with a more compact configuration and higher mechanical strength are obtained, by virtue of the reduction in the notch effects due to the arc or round-shaped cross-section of the cavities 72 on the external cylindrical surface 64. Furthermore, the cavities 72 and 74 are extremely simple to make (for example by drilling operations), which makes it simpler, and thus also less expensive, the manufacturing process of the synchronizer.

The operation of the synchronizer 10 of the invention is substantially the same as the one of the synchronizers provided with known pre-synchronization devices and therefore will not be described here.

As already said, by virtue of the particular configuration of the phasing system described above, the hub and the synchronizing rings of the synchronizer according to the invention are simpler and less expensive to manufacture, as dedicated milling operations for making the parts of the phasing system are no more necessary, but simple drilling operations are only required. Additionally, the parts of the phasing system, in particular the hub, are more resistant and less subject to deformations during the heat treatments which they typically have to undergo.

Furthermore, by virtue of the particular shape of the blocking elements, it is possible to make, differently from the prior art, a hub with no cavities intended to receive the bodies of the blocking elements. The hub is, thus, mechanically more resistant than the prior art. Moreover, the hub may undergo heat treatments more easily, as it is less prone to deformations during the heat treatment. Additionally, the diameter of the actuating sleeve remaining unchanged, the hub may have a larger diameter of the internal splined portion than the prior art and thus be used on transmission shafts with a larger diameter than the prior art. Besides, the blocking elements are simpler, less expensive and lighter than the prior art. The hub itself is less expensive to manufacture, as it has no cavities like those of the prior art and therefore can be manufactured using cheaper technologies than those required for the manufacturing of hubs for synchronizers according to the prior art.

Naturally, the principle of the invention remaining unchanged, the embodiments and constructional details may vary widely from those described and illustrated purely by way of non-limiting example, without thereby departing from the scope of the invention as defined in the enclosed claims.

The invention claimed is:

1. A synchronizer for mechanical transmissions, the synchronizer being arranged to be mounted on a transmission shaft extending along a longitudinal axis to selectively connect the transmission shaft for rotation with at least one gear wheel idly mounted on said shaft, the synchronizer comprising:
   a hub which is arranged to be torsionally connected with the transmission shaft and is provided with external teeth,
   an actuating sleeve which is slidable in the direction of a longitudinal axis of the transmission shaft and is provided with internal teeth meshing with the external teeth of the hub,
   at least one synchronizing ring which is provided with external teeth arranged to mesh with the internal teeth of the actuating sleeve and has, on its radially internal side, a friction surface arranged to cooperate with a friction surface associated to a respective gear wheel to allow the generation of a friction torque between the synchronizing ring and the associated gear wheel,
   a pre-synchronization system comprising a plurality of blocking elements operatively placed between the hub and the actuating sleeve, and
   a phasing system arranged to ensure a given angular positioning of said at least one synchronizing ring with respect to the hub about said longitudinal axis, the phasing system comprising a plurality of first cavities provided on an internal cylindrical surface of a ring gear of the hub forming the external teeth of the hub;
   wherein said first cavities have an arc- or round-shaped cross-section, including a semi-circular cross-section.

2. The synchronizer according to claim 1, wherein the phasing system comprises, for each of said first cavities, a respective tooth that protrudes radially from an external cylindrical surface of said at least one synchronizing ring and meshes with said first cavity, said tooth having a cross-section with a shape mating the one of the cross-section of said first cavity.

3. The synchronizer according to claim 1, wherein the phasing system comprises, for each of said first cavities, a respective connecting pin engaging in said first cavity and in a respective second cavity that is provided on an external cylindrical surface of said at least one synchronizing ring and has a cross-section of the same shape as the one of said first cavity.

4. The synchronizer according to claim 1, wherein each blocking element comprises a body mounted in a respective seat provided on the hub, an engaging member movable with respect to the body between a first operative position, wherein the engaging member partially protrudes from the body to engage the actuating sleeve, and a second operative position, wherein the engaging member is accommodated within the body and is thus disengaged from the actuating sleeve, and an elastic member acting on the engaging member so as to elastically push it towards said first operative position, and wherein each blocking element is configured in such a way that the engaging member is movable in a substantially tangential direction between said first operative position and said second operative position.

5. The synchronizer according to claim 4, wherein the body of each blocking element has a radial size such that the ratio of said radial size to the pitch radius of the external teeth of the hub is smaller than $1/6$, including smaller than $1/10$.

6. The synchronizer according to claim 5, wherein the radial size of the body of each blocking element is not larger than the depth of the external teeth of the hub.

7. The synchronizer according to claim 6, wherein the body of each blocking element has a radially internal face, a radially external face, and a pair of first lateral faces extending parallel one to the other and parallel to said longitudinal axis, wherein the engaging member protrudes from one of said first lateral faces of the body, when in said first operative position.

8. The synchronizer according to claim 7, wherein the body of each blocking element comprises a first body part forming said radially external face and a second body part, separate from the first body part, forming said radially internal face, said first and second body parts being firmly connected to one another.

9. The synchronizer according to claim 8, wherein the body of each blocking element is made of plastic material.

10. The synchronizer according to claim 9, wherein the engaging member of each blocking element is a disk-shaped member.

11. The synchronizer according to claim 10, wherein the elastic member of each blocking element is an S-shaped wire or strip spring.

* * * * *